United States Patent [19]
Moyna

[11] Patent Number: 5,456,521
[45] Date of Patent: Oct. 10, 1995

[54] UNLOADING GATE FOR A DUMP TRUCK BODY

[75] Inventor: John P. Moyna, R.R. 1 28, Elkader, Iowa 52043

[73] Assignee: Moyna; John P., Elkader, Iowa

[21] Appl. No.: 298,168

[22] Filed: Aug. 30, 1994

[51] Int. Cl.⁶ ........................................ B60P 1/04
[52] U.S. Cl. ..................... 298/1 B; 298/1 R; 414/492; 414/511
[58] Field of Search .................. 298/1 R, 1 B, 298/1 V, 17 R; 414/492, 511

[56] References Cited

U.S. PATENT DOCUMENTS

| | | |
|---|---|---|
| 1,485,632 | 3/1924 | Shea . |
| 1,927,653 | 9/1933 | Wehr . |
| 2,047,602 | 7/1936 | Tomlinson . |
| 2,166,846 | 7/1939 | McCalley . |
| 2,179,726 | 11/1939 | Lewis et al. . |
| 2,463,987 | 3/1949 | Malone et al. . |
| 2,800,234 | 7/1957 | Herpich et al. . |
| 2,911,119 | 11/1959 | Kuhnau ................ 298/1 B |
| 3,083,849 | 4/1963 | Mottin ................. 298/1 B |
| 3,164,410 | 1/1965 | Robinson et al. . |
| 3,625,140 | 12/1971 | Glanz . |
| 3,739,715 | 6/1973 | Ambrose . |
| 3,815,323 | 6/1974 | Longo . |
| 3,827,753 | 8/1974 | Pitts . |
| 3,880,072 | 4/1975 | Ord . |
| 3,901,394 | 8/1975 | Bowles ................. 414/511 |
| 4,145,824 | 3/1979 | Watson . |
| 4,467,712 | 8/1984 | Fincham . |
| 4,548,131 | 12/1985 | Williams . |
| 4,576,540 | 3/1986 | Derain et al. ........... 414/511 |
| 4,745,856 | 5/1988 | Bakker et al. . |
| 4,775,283 | 10/1988 | Krapp et al. ........... 414/492 |
| 5,281,074 | 1/1994 | Mashuda .............. 414/511 |

FOREIGN PATENT DOCUMENTS

2152881B2 5/1981 Germany .

Primary Examiner—Michael S. Huppert
Assistant Examiner—Gregory A. Morse
Attorney, Agent, or Firm—Hill, Steadman & Simpson

[57] ABSTRACT

An unloading gate for a dump truck body which is movably mounted on rails in the dump truck body so that it can be actuated to scrape and clean the body during unloading and which has a positive locking means for locking the unloading gate in a fixed position relative to the body.

1 Claim, 2 Drawing Sheets

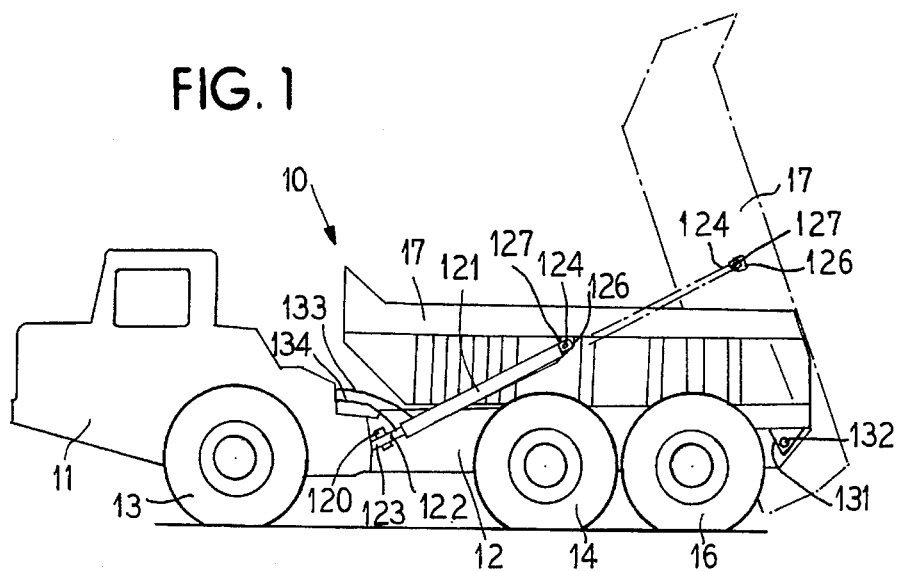
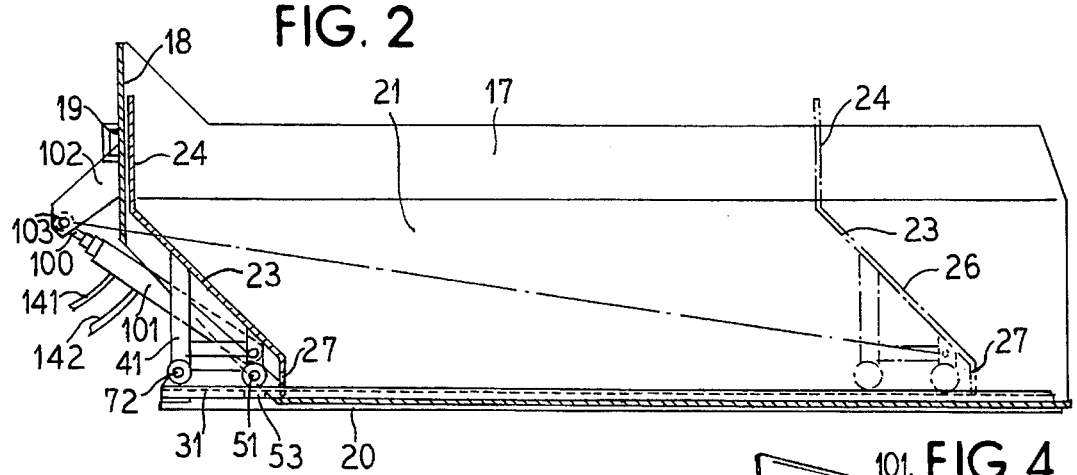
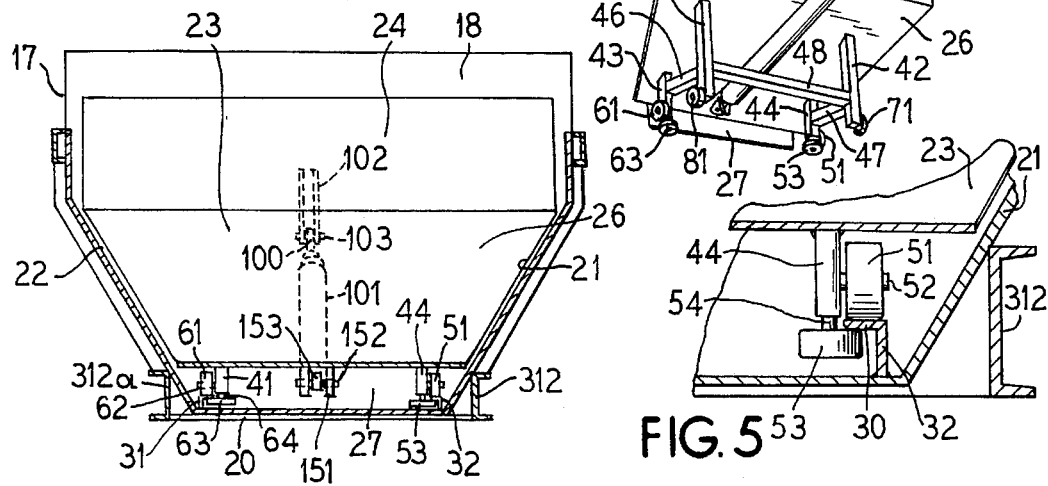
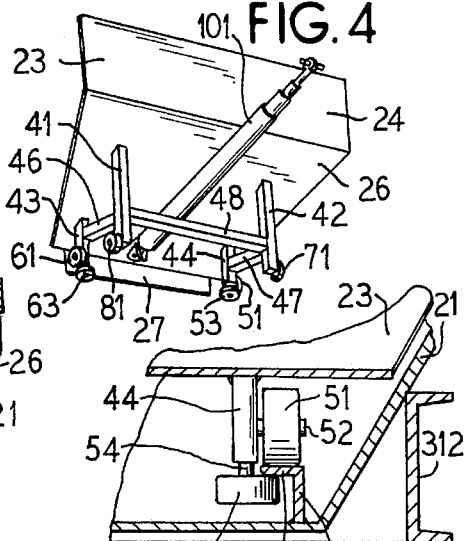

5,456,521

UNLOADING GATE FOR A DUMP TRUCK BODY

BACKGROUND OF THE INVENTION

1. Field of the Invention

This invention relates in general to an unloading gate for a dump truck body and, in particular, to an unloading gate that allows the body to be cleaned upon actuation.

2. Description of Related Art

Dump trucks have been available for many years, which are used for carrying different loads, in particular, in the construction industry dirt is moved by very large articulated dump trucks and the material being carried has a tendency to stick to the bottom and sides of the body which prevents the unloading of all of the materials. Plastic liners have been developed which are mounted in the truck body so that the material will slide from the body during dumping. However, such liners rapidly wear and some materials stick to such liners.

See also U.S. Pat. Nos. 1,927,653, 1,485,632, 4,145,824, 4,548,131, 3,880,072, 3,815,323, 2,179,726, 2,166,846, 2,047,602, 2,800,234, 2,463,987, 3,164,410, 3,827,753, 3,739,715, 3,625,140, 4,467,712, 4,745,856, and German DE 2 152 881.

SUMMARY OF THE INVENTION

The present invention comprises an unloading gate for a dump truck body which is mounted on a carriage that has rollers that ride on a pair of rails mounted in the bottom of the dump truck body and also has retaining rollers for holding the carriage and the unloading gate on the rails. The dump truck body can be pivoted upwardly to an unloading position in a conventional manner during which time the unloading gate is locked in position at the front end of the dump truck body. A lock holds the unloading gate so that it is stationary in the dump truck body and the lock can be released after which the unloading gate can be moved by the carriage so as to scrape and clean debris such as dirt from the dump truck body by moving the unloading gate from the front end to the rear end of the body. After the unloading gate has moved the full length of the dump truck body, it can be returned to its initial position at the front end of the body and locked in position so that the dump truck can be reused.

The locking means for the unloading gate may be actuated by manual, electric, hydraulic or pneumatic means and may be actuated remotely such as from the cab of the truck. The actuating means for moving the unloading gate and carriage upon which it is mounted may be hydraulic, pneumatic, electric or mechanical and can be actuated remotely as, for example, from the cab of the truck.

It is an object of the present invention to provide an unloading cleanout gate for a dump truck which allows substantially all of the material carried by the dump truck to be emptied from the body.

It is another object of the invention to provide a locking means for an unloading gate for a dump truck which positively locks the gate in a predetermined position when it is not being actuated.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a side plan view of a dump truck which the invention is mounted;

FIG. 2 is a sectional view of the dump truck body illustrating the unloading gate from a side section;

FIG. 3 is a plan view of the unloading gate looking into the truck body from the rear end;

FIG. 4 is a perspective view illustrating the carriage upon which the unloading gate is mounted;

FIG. 5 is a detail sectional view illustrating one of the rails upon which the rollers of the carriage ride as well as one of the retaining rollers for the carriage;

DETAILED DESCRIPTION OF THE PREFERRED EMBODIMENTS

Figure 6:
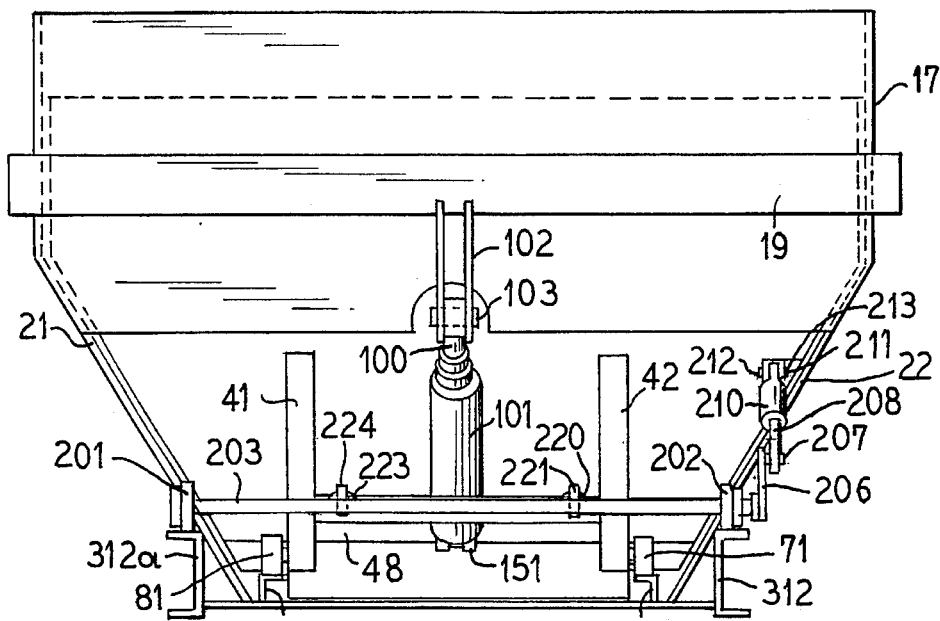
FIG. 6 is a plan view illustrating the unloading gate structure.
Figure 7:
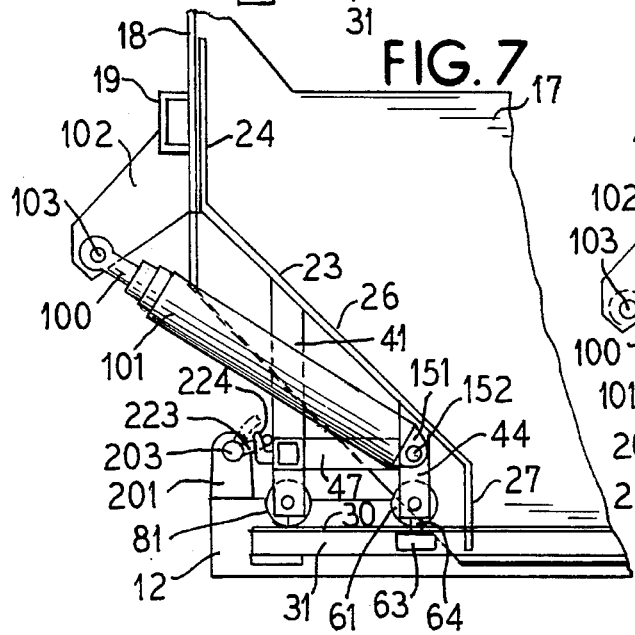
FIG. 7 is a side sectional view illustrating the locking mechanism for the unloading gate.

FIG. 1 illustrates a dump truck 10 which has a tractor 11 and has a rear frame portion 12 upon which a dump truck body 17 is pivotally mounted on pivot shaft 132 that passes through the frame 12 and is connected to a bracket 131 on the rear end of the dump truck body 17. The tractor 11 and frame 12 are mounted on ground wheels 13, 14 and 16 and similar wheels are mounted on the opposite side of the machine. The dump truck body 17 can be pivoted with a pair of hydraulic cylinders 121 which has an upper end 126 that is connected by pivot pin 124 to a bracket 127 attached to the body 17. The piston of the hydraulic cylinder 121 is connected to a shaft 122 which is pivotally connected by a pivot pin 120 to a bracket 123 mounted on the frame 12. Hydraulic lines 133 and 134 communicate with the hydraulic cylinder 121 and the hydraulic system of the tractor 11 in a suitable control is mounted in the cab of the tractor 11 for actuating the hydraulic cylinder 121 to operate the body 17 from the horizontal position indicated in solid line to the unload position illustrated in dash-dot line. It is to be realized that there is a hydraulic cylinder mounted on both sides of the truck body and only one of the hydraulic cylinders is illustrated in FIG. 1.

As shown in FIGS. 2–5, the dump truck body 17 has a bottom 20 and side walls 21 and 22 and a rear upwardly extending portion 18.

A pair of L-shaped rails 31 and 32 are mounted in the bottom 20 of the body 17 and extend through an opening formed in the front end of the body 17 below the upper extending portion 18. A moveable unloading gate 23 has a substantially vertical upper portion 24 and a lower tapered portion 26 which is mounted on a carriage that rides on the rails 31 and 32 as shown in FIGS. 2–5. The carriage has a vertical frame members 41 and 42 as best in FIGS. 2 and 4, which are attached to the lower portion 26 of the unloading gate 23 and has front vertical supporting members 43 and 44 attached to a lower portion of the unloading gate 23. Horizontal frame members such as 46 connect the members 41 and 43 and a horizontal member 47 connects the vertical members 42 and 44. A transverse member 48 connects the vertical members 41 and 42 as shown in FIG. 4. Rollers 51, 61, 71 and 81 are respectively mounted on the lower ends of vertical members 44, 43, 42 and 41 and each roller is supported by a suitable shaft such as shaft 52 illustrated for the roller 51. The other rollers are mounted on similar shafts which extend through the associated vertical supporting member. Two rails 31 and 32 are formed with vertical portions and horizontal extending portions 30 illustrated in FIG. 5 and a retaining roller 53 mounted on the shaft 54 is connected to the vertical member 44 and its side edge extends into and runs under the extending portion 30 so as to hold the carriage on the rail 32. A second horizontally mounted roller 63 is mounted on a shaft 64 connected to a vertical member 41 as shown in FIG. 3 and rides under the extending portion of rail 31. The unloading gate has a downwardly extending portion 27 which fits between the rails 31 and 32 and is connected to a lower portion of the tapered portion 26 as illustrated in FIGS. 2 and 4. A hydraulic cylinder 101 has an extending portion 153 formed with an opening which is received between brackets 151 which also have an aligned opening through which a pivot shaft 152 is received. The bracket 151 is connected to the rear surface of the unloading gate 23. The other end of the hydraulic cylinder 101 has its piston shaft 100 connected by pivot pin 103 to a bracket 102 mounted on the frame 19 of the dump truck body 17. Hydraulic lines 141 and 142 extend to a suitable control that may be mounted in the cab of the tractor 11 so as to actuate the multiple hydraulic cylinder 101 so as to drive the unloading gate 23 mounted on the carriage and rollers along the rails 31 and 32 so as to scrape and unload the body 17.

FIGS. 6–9 illustrating a locking mechanism for the unloading gate 23 so as to positively lock the unloading gate 23 to the body 17 so that it will not move on the rails 31 and 32 except when the locking means is released.

A pair of longitudinal beams 312 and 312a are attached to the lower portion of the body 17 as shown in FIGS. 3, 5, 6 and 8 and brackets 201 and 202 are mounted on the members 312a and 312 and rotatably support a shaft 203. A crank arm 206 is non-rotatably connected to the shaft 203 and its other end is connected by a pin 207 to an end 208 of a piston shaft 209 of a hydraulic cylinder 210. The other end 212 of the cylinder 210 is connected by a pivot pin 211 to a bracket 213 mounted to the body 17. Hydraulic lines, not shown, are connected to the hydraulic cylinder 210 and connect to the hydraulic system of the tractor 11 so that the cylinder 210 can be actuated from a remote position such as the cab of the tractor 11.

Figure 8:
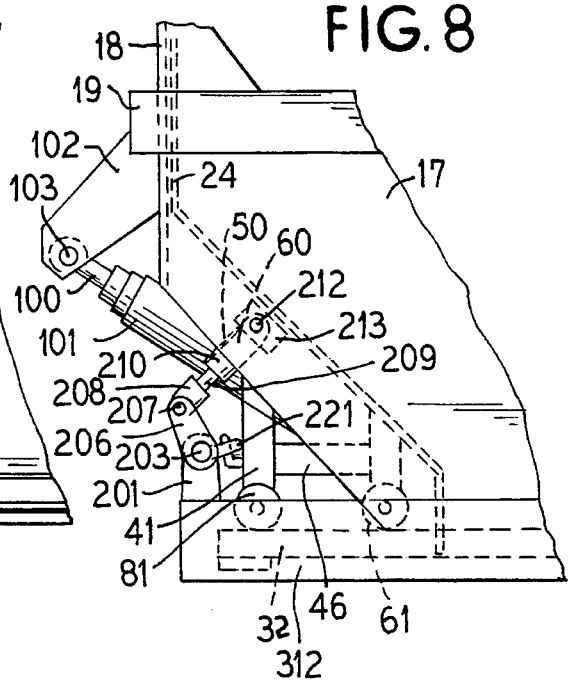
FIG. 8 illustrates the locking mechanism for the unloading.
Figure 9:
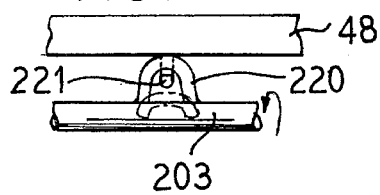
FIG. 9 is a cut-away detail view of the locking means for the unloading gate.

The shaft 203 is formed with a pair of U-shaped locking brackets 220 and 223, which in the locked position are receivable over the locking pins 221 and 224 mounted on the carriage of the unloading gate 26. FIGS. 6, 8 and 9 illustrate in solid line the locked position for the carriage wherein the U-shaped brackets 220 and 223 engage locking pins 221 and 224. A dash-dot line position illustrates when the members 220 and 223 are unlocked from the locking pins 220 and 224 by activating cylinder 210.

In operation, initially the unloading gate 23 and carriage are locked by the locking cylinder 210 to the body 17 of the truck and the truck is loaded with the body 17 being in the horizontal position illustrated in solid line in FIG. 1. When the truck is to be unloaded, the cylinders 121, on either side of the truck, are actuated so as to tilt the body 17 upwardly so that the material is unloaded from the rear end of the body 17. The locking means including the cylinder 210 assures that the unloading gate 23 and its carriage will not move from the forward end of the body unless desired. When it is desired to actuate the unloading gate 23, the cylinder 210 is actuated so as to rotate the shaft 203 in a counterclockwise direction relative to FIGS. 7 and 8 so that the locking members 220 and 223 disengage the locking pins 221 and 224. Then the cylinder 101 can be actuated to drive the unloading gate 23 and its associated carriage on the rails 31 and 32 so that it scrapes and cleans the inside of the body 17 as it moves toward the rear of the body 17. The lower portion 27 and the side edges of the unloading gate 23 scrape and remove the material in the body 17 so that the body is cleaned and all the material can be unloaded. After unloading has occurred, the body 17 is returned to the horizontal position and the unloading gate 23 is moved by the cylinder 101 to the front position shown in solid line in FIG. 2 after which the locking cylinder 210 is actuated so that the bracket members 220 and 223 lock over the pins 221 and 224 to lock the loading gate 23 and the forward loading position.

It is seen that this invention comprises an unloading gate for a dump truck body which rides on a carriage on rails mounted in the dump truck body and wherein the unloading gate can be positively locked and unlocked so that it can be actuated to clean out the body.

Although it has been described with respect to preferred embodiments, it is not to be so limited as changes and modifications can be made therein which are within the full intended scope as defined by the appended claims.

I claim as my invention:

1. A dump truck with a pivoted dump body, a first hydraulic actuating means attached between said truck and said pivoted dump body so as to pivot it to different positions, a pair of rails mounted to the bottom of said dump body, a carriage mounted on four rollers which are engageable with said pair of rails, a moveable unloading gate mounted on said carriage, second hydraulic actuating means connected between said dump body and said carriage for moving it on said pair of rails, a locking means mounted on said dump body and said carriage to selectively lock said carriage to said dump body, wherein said pair of rails have horizontal ledges, and fifth and sixth retaining rollers mounted on said carriage so as to rotate in a horizontal plane and said retaining rollers have surfaces engageable under said horizontal ledges of said rails so as to hold said carriage on said rails, wherein said locking means comprises a shaft rotatably supported on said dump body, a locking bracket mounted on said shaft, a locking pin mounted on said carriage which is releasably engaged by said locking bracket; and wherein said shaft is connected to a third hydraulic actuating means which selectively rotates it to lock and unlock said carriage.

* * * * *